(No Model.)
M. C. NIXON.
BALING PRESS.
No. 494,686. Patented Apr. 4, 1893.
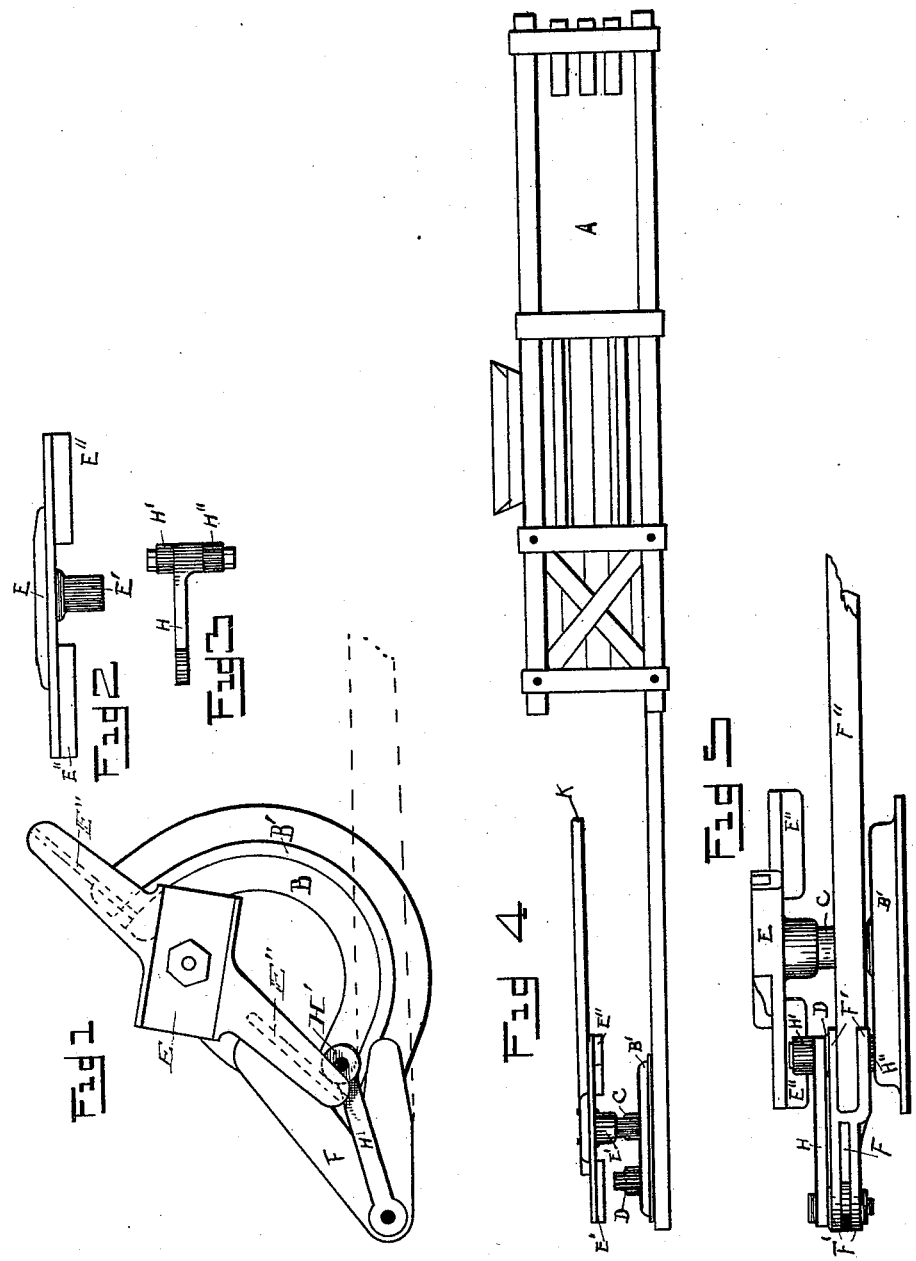
WITNESSES:
W. Donahoe
H. V. Sues
INVENTOR
Moses C. Nixon
BY G. W. Sues.
ATTORNEY.

UNITED STATES PATENT OFFICE.

MOSES C. NIXON, OF OMAHA, NEBRASKA.

BALING-PRESS.

SPECIFICATION forming part of Letters Patent No. 494,686, dated April 4, 1893.

Application filed October 2, 1891. Serial No. 407,572. (No model.)

*To all whom it may concern:*

Be it known that I, MOSES C. NIXON, of Omaha, in the county of Douglas and State of Nebraska, have invented certain useful Improvements in Baling-Presses; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in baling presses, and relates more particularly to that class known as perpetual or continuous presses.

The object of this invention is, to provide a horse power baling press that shall embody a power mechanism for compressing cotton, moss, hay, &c., that shall be extremely simple of construction, and readily operated; and in furtherance of this object, my invention consists in the construction, combination and arrangements of parts, as hereinafter more fully described and finally pointed out in the claims.

In the accompanying drawings Figure 1 shows a top view of my improved mechanism, Fig. 2 a side view of the actuating arms, Fig. 3 a side view of the draft toggle. Fig. 4 shows my invention with parts eliminated, as connected to a press, and Fig. 5 a side elevation of Fig. 1.

Similar letters of reference refer to corresponding parts.

A indicates a baling press as usually constructed, to the projecting sills of which is secured, the semicircular base plate of iron, B, or any other suitable material. This plate is provided with an upwardly extending flange B', and the journal posts C and D, as shown more clearly in Fig. 4. The post C is situated near one of the terminals of the flange B', while the post D, which does not extend quite as far as the post C, is situated nearer the opposite end of the flange, as will be understood by referring to Fig. 1. Both of these posts are smooth and cylindrical upon their upper ends, the one marked C offering a bearing to the stock E' of the actuating arms E, and the lower one D, offering a pivotal support to the toggle link F, as shown. Both of the cylindrical stocks work revolubly upon their posts in the manner of a cap. At the outer end, the link F is engaged by a bifurcated shoe F', which is secured to and forms part of the plunger bar F'', as is usual in devices of this class.

Pivotally secured to the shoe F' upon the upper side, is the draft link H, as shown in Fig. 3, provided at its free end with the journals or rolls H', H''. By means of these rolls, the link H is given direction. The actuating arms E E are each provided with a depending flange E'', which terminates near the stock E', so as to leave an escape way, as shown in Fig. 2. Above, the arms are provided with an operating lever K as shown in Fig. 4 by means of which the device is operated, the horse or cattle circling about said power mechanism in operating the same.

In starting the device, the plunger bar F'' is first drawn outward its full stroke, assuming the position as illustrated in Figs. 1 and 5, and a sufficient quantity of hay is fed into the presser box, when the device is ready to be put into operation.

In revolving the flanges E'' of the arms E come in contact with the projecting roll H' and tend to carry said roll before them. The lower roll H'', however, works against the inner side of the flange B' of the plate B and thus guides and gives the link H direction, and as this link is carried forward, the link F and connected plunger bar F'' are also carried forward. As the roll H' follows the flange B' it comes nearer and nearer the journal post C, and also continually nearer the inner end of the flange E'' of the arms E, until just before the end of the circular flange is reached the roll H' is permitted to escape over the end of the flange. The plunger bar F'' as soon as the link H has escaped, is promptly thrown outward, by virtue of the elasticity of the compressed material, assuming its original position, as illustrated in Fig. 1. The draft link H is, however, now engaged by the second arm, and again forced around its path, so that the plunger F'' makes two strokes, to every revolution of the arms E.

The device is noticeable because of its extreme simplicity, and

Having thus described my said invention, what I claim as new, and desire to secure by United States Letters Patent, is—

1. The combination in a baling press, of a power mechanism comprising a base plate provided with a circular flange, and two journal posts, flanged actuating arms revolubly held upon one of said posts, and a toggle link pivotally secured to the remaining post, a plunger bar connected to said toggle link, and a draft link secured to said toggle and provided with two projecting rolls, one of said rolls being engaged and guided by said circling flange, the other being engaged successively by the flanged revolving arms, to operate said press, all substantially as and for the purpose set forth.

2. The combination in a baling press, of the following instrumentalities, to wit: the base plate B provided with the flange B' and the journal posts C and D, the actuating arms E E revolubly held upon the post C, and the toggle link F pivotally secured to the post D, the plunger bar F'' and shoe F', and the draft arm H, provided with the projecting rolls H', H'', all of said instrumentalities being arranged to operate substantially as and for the purpose set forth.

In testimony whereof I affix my signature in presence of two witnesses.

MOSES C. NIXON.

Witnesses:
C. B. BOSTWICK,
G. C. LAMBERT.